(12) United States Patent
Park

(10) Patent No.: US 12,516,827 B2
(45) Date of Patent: Jan. 6, 2026

(54) ROTISSERIE ASSEMBLY FOR AN OVEN

(71) Applicant: Kyle Park, South Burlington, VT (US)

(72) Inventor: Kyle Park, South Burlington, VT (US)

( * ) Notice: Subject to any disclaimer, the term of this patent is extended or adjusted under 35 U.S.C. 154(b) by 699 days.

(21) Appl. No.: 17/897,143

(22) Filed: Aug. 27, 2022

(65) Prior Publication Data

US 2024/0068672 A1 Feb. 29, 2024

(51) Int. Cl.
 *F24C 15/16* (2006.01)
 *A47J 37/04* (2006.01)
 *F24C 15/34* (2006.01)

(52) U.S. Cl.
 CPC ........... *F24C 15/164* (2013.01); *A47J 37/041* (2013.01); *F24C 15/34* (2013.01)

(58) Field of Classification Search
 CPC ........ F24C 15/34; F24C 15/164; A47J 37/041
 See application file for complete search history.

(56) References Cited

U.S. PATENT DOCUMENTS

| | | | | |
|---|---|---|---|---|
| 2,787,948 A | * | 4/1957 | Mathis | A47J 37/041 |
| | | | | 126/41 B |
| 2,821,903 A | * | 2/1958 | Allen, Jr. | A47J 37/041 |
| | | | | 310/66 |
| 2,847,932 A | * | 8/1958 | More | A47J 37/041 |
| | | | | 126/30 |
| 2,854,918 A | * | 10/1958 | Merritt | F24C 15/164 |
| | | | | 126/340 |
| 2,951,435 A | * | 9/1960 | Fry | A47J 37/041 |
| | | | | 99/421 H |
| 2,985,096 A | * | 5/1961 | Wolske | A47J 37/041 |
| | | | | 99/421 P |
| 3,199,438 A | * | 8/1965 | Myler | A47J 37/041 |
| | | | | 99/450 |
| 3,633,491 A | * | 1/1972 | Williams, Jr. | F24C 15/164 |
| | | | | 99/421 H |
| 2015/0320257 A1 | * | 11/2015 | Carbone | A47J 37/041 |
| | | | | 99/468 |

FOREIGN PATENT DOCUMENTS

DE 202006012307 U1 * 1/2008 ............ A47J 37/041

* cited by examiner

*Primary Examiner* — Woody A Lee, Jr.
(74) *Attorney, Agent, or Firm* — The Iwashko Law Firm, PLLC; Lev Ivan Gabriel Iwashko

(57) ABSTRACT

A rotisserie assembly connected to at least a portion of a rack of an oven, the rotisserie assembly including a main rod to receive food thereon, a first elevating rack connected to a first end of the main rod and disposed on the rack to elevate the main rod a distance away from the rack, a second elevating rack connected to a second end of the main rod and disposed on the rack to elevate the main rod the distance away from the rack, and a motor connected to at least a portion of the first elevating rack to rotate the main rod in response to rotation of the motor.

6 Claims, 1 Drawing Sheet

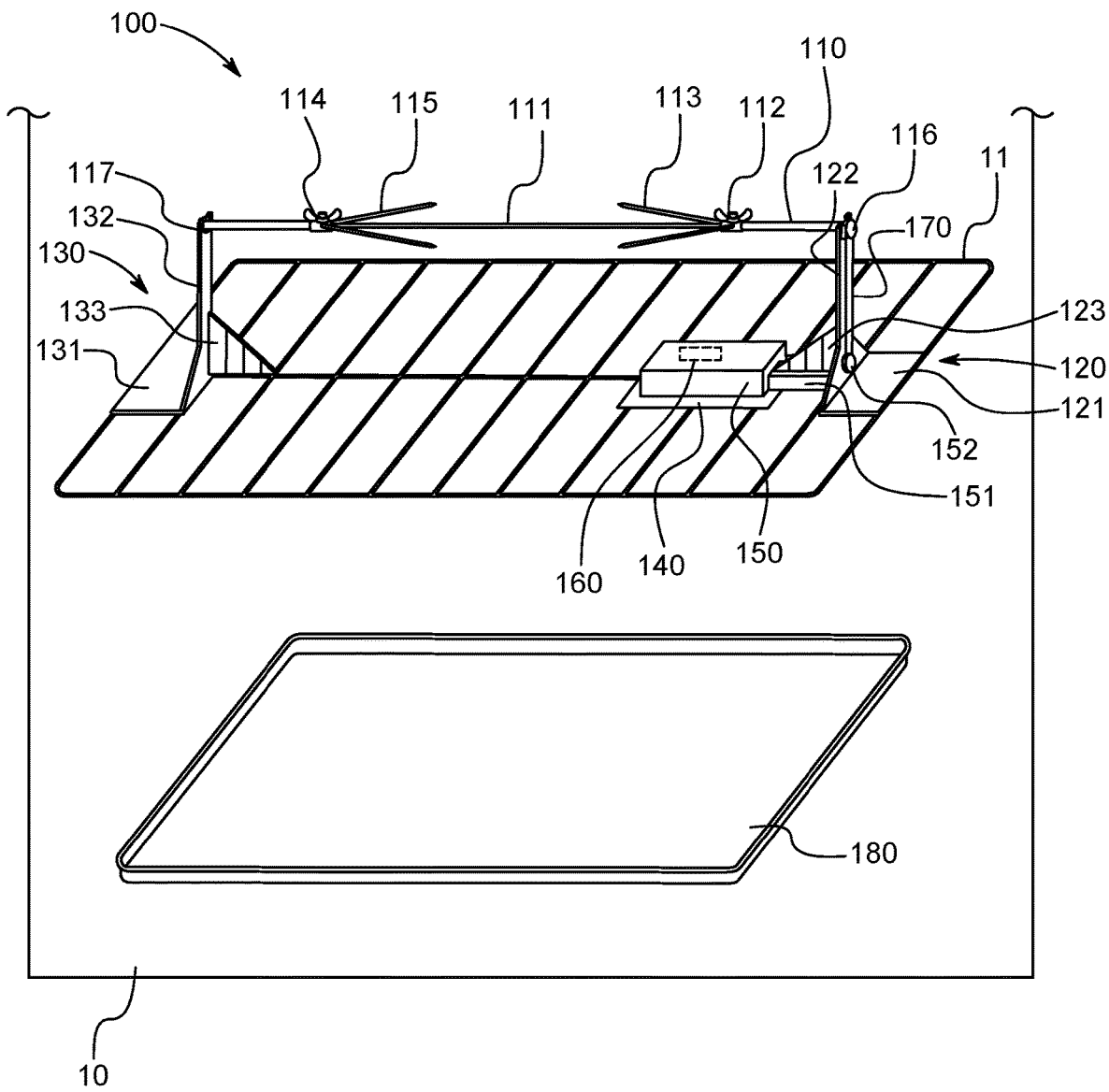

ROTISSERIE ASSEMBLY FOR AN OVEN

BACKGROUND

1. Field

The present general inventive concept relates generally to cooking, and particularly, to a rotisserie assembly for an oven.

2. Description of the Related Art

For many people, rotisserie ovens are considered to be one of the best appliances to cook food that often results in delicious, flavorful dishes. However, rotisserie ovens are a difficult appliance to shop for as true dedicated rotisserie ovens are rare and a lot of the multi-use models that exist lack useful features and/or have severe drawbacks.

Furthermore, purchasing another kitchen appliance can not only take up vast amounts of space in a kitchen, but can quickly become incredibly costly and inconvenient to maintain.

Therefore, there is a need for a rotisserie assembly that can make use of an existing oven and provide the ability to roast food with a rotisserie style.

SUMMARY

The present general inventive concept provides a rotisserie assembly for an oven.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a rotisserie assembly connected to at least a portion of a rack of an oven, the rotisserie assembly including a main rod to receive food thereon, a first elevating rack connected to a first end of the main rod and disposed on the rack to elevate the main rod a distance away from the rack, a second elevating rack connected to a second end of the main rod and disposed on the rack to elevate the main rod the distance away from the rack, and a motor connected to at least a portion of the first elevating rack to rotate the main rod in response to rotation of the motor.

The main rod may include a center portion, a first fork fastener connected to at least a portion of a first end of the center portion, a first fork disposed on at least a portion of the first fork fastener to puncture the food, a second fork fastener connected to at least a portion of a second end of the center portion, and a second fork disposed on at least a portion of the second fork fastener to puncture the food.

The center portion may be removable from the first fork fastener and the second fork fastener.

The first fork and the second fork may be deformable.

The first elevating rack may include a first base, and a first pillar perpendicularly disposed at a first end away from the first base with respect to a direction to connect at a second end to the first end of the main rod and prevent the main rod from moving away from the first pillar.

The second elevating rack may include a second base, and a second pillar perpendicularly disposed at a first end away from the second base with respect to a direction to connect at a second end to the second end of the main rod and prevent the main rod from moving away from the second pillar.

The rotisserie assembly may further include a motor protection base removably connected to at least a portion of the motor to insulate the motor from an increase in a temperature level.

The rotisserie assembly may further a cord connected to the main rod and the motor to rotate the main rod in response to rotation of the motor.

BRIEF DESCRIPTION OF THE DRAWINGS

These and/or other features and utilities of the present generally inventive concept will become apparent and more readily appreciated from the following description of the embodiments, taken in conjunction with the accompanying drawings of which:

FIG. 1 illustrates a side perspective view of a rotisserie assembly for an oven, according to an exemplary embodiment of the present general inventive concept.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Rotisserie Assembly 100
Main Rod 110
Center Portion 111
First Fork Fastener 112
First Fork 113
Second Fork Fastener 114
Second Fork 115
First Connecting End 116
Second Connecting End 117
First Elevating Rack 120
First Base 121
First Pillar 122
First Support Portion 123
Second Elevating Rack 130
Second Base 131
Second Pillar 132
Second Support Portion 133
Motor Protection Base 140
Motor 150
Rod Connector 151
Cord Connector 152
Control Unit 160
Cord 170
Drain Tray 180

FIG. 1 illustrates a side perspective view of a rotisserie assembly 100 for an oven 10, according to an exemplary embodiment of the present general inventive concept.

The rotisserie assembly 100 may be constructed from at least one of metal, ceramic, and glass, etc., but is not limited thereto. Also, the rotisserie assembly 100 may be highly durable and heatproof.

The rotisserie assembly 100 may include a main rod 110, a first elevating rack 120, a second elevating rack 130, a motor protection base 140, a motor 150, a control unit 160, a cord 170, and a drain tray 180, but is not limited thereto.

The main rod 110 may include a center portion 111, a first fork fastener 112, a first fork 113, a second fork fastener 114, a second fork 115, a first connecting end 116, and a second connecting end 117, but is not limited thereto.

The main rod 110 may be elongated and have a cylindrical shape. However, the main rod 110 may be rectangular, triangular, pentagonal, hexagonal, heptagonal, octagonal, and/or any other shape known to one of ordinary skill in the art.

Moreover, the main rod 110 may have a predetermined length corresponding to a length and/or width of a rack 11 of the oven 10.

Referring to FIG. 1, the center portion 111 may be have a shape and size different from other portions of the main rod 110. For example, a diameter and/or a circumference of the center portion 111 may be less than a diameter and/or a circumference of the main rod 110. Moreover, the center portion 111 may be removably connected to at least a portion of the main rod 110. In other words, the center portion 111 may be detached from the main rod 110, such that the main rod 110 may separate into multiple pieces.

Referring again to FIG. 1, the first fork fastener 112 is illustrated to be a wing nut. However, the first fork fastener 112 may include a screw, a nut, a bolt, a washer, a magnet, and/or any combination thereof, but is not limited thereto.

The first fork fastener 112 may be disposed on at least a portion of the main rod 110. The first fork fastener 112 may connect to at least a portion of a first end of the center portion 111. Specifically, the first end of the center portion 111 may be inserted into the first fork fastener 112 on the main rod 110. In other words, the first end of the center portion 111 may be inserted into the main rod 110 at the first fork fastener 112. Furthermore, the first fork fastener 112 may tighten the first end of the center portion 111 within the main rod 110 in response to moving (i.e. rotating) in a first direction or a second direction, and loosening the first end of the center portion 111 within the main rod 110 in response to moving in the second direction or the first direction, such that the first end of the center portion 111 may be extracted from the main rod 110.

The first fork 113 may include at least one tine. Additionally, the at least one tine of the first fork 113 may be moved (i.e. deformed, bent, flexible) to adjust a position thereof, such that the at least one tine of the first fork 113 may puncture food, such as turkey, chicken, pork, and/or any other type of meat.

Referring again to FIG. 1, the second fork fastener 114 is illustrated to be a wing nut. However, the second fork fastener 114 may include a screw, a nut, a bolt, a washer, a magnet, and/or any combination thereof, but is not limited thereto.

The second fork fastener 114 may be disposed on at least a portion of the main rod 110. The second fork fastener 114 may connect to at least a portion of a second end of the center portion 111 opposite with respect to the first end of the center portion 111. Specifically, the second end of the center portion 111 may be inserted into the second fork fastener 114 on the main rod 110. In other words, the second end of the center portion 111 may be inserted into the main rod 110 at the second fork fastener 114. Furthermore, the second fork fastener 114 may tighten the second end of the center portion 111 within the main rod 110 in response to moving (i.e. rotating) in a first direction or a second direction, and loosening the second end of the center portion 111 within the main rod 110 in response to moving in the second direction or the first direction, such that the second end of the center portion 111 may be extracted from the main rod 110.

The second fork 115 may include at least one tine. Additionally, the at least one tine of the second fork 115 may be moved (i.e. deformed, bent, flexible) to adjust a position thereof, such that the at least one tine of the second fork 115 may puncture food, such as turkey, chicken, pork, and/or any other type of meat.

The first connecting end 116 may be disposed on at least a portion of a first end of the main rod 110. Additionally, the first connecting end 116 may have a size (e.g., a diameter, a circumference) greater than the size of the main rod 110.

The second connecting end 117 may be disposed on at least a portion of a second end of the main rod 110 opposite with respect to the first end of the main rod 110. Additionally, the second connecting end 117 may have a size (e.g., a diameter, a circumference) greater than the size of the main rod 110. However, the size of the second connecting end 117 may be similar to the size of the first connecting end 116.

The first elevating rack 120 may include a first base 121, a first pillar 122, and a first supporting portion 123, but is not limited thereto.

The first base 121 may be constructed as a planar surface. Moreover, the first base 121 may be disposed on at least a portion of the rack 11.

The first pillar 122 may be perpendicularly disposed at a first end away from the first base 121 with respect to a direction. Accordingly, the first pillar 122 may be perpendicularly disposed away from the rack 11 and/or any other surface under the first base 121 with respect to the direction while the first base 121 is disposed on the rack 11 and/or another surface. The first pillar 122 may receive and/or connect at a second end to the first end of the main rod 110 and/or the first connecting end 116. More specifically, the second end of the first pillar 122 may have a groove to receive the main rod 110 therein, such that the second end of the first pillar 122 may prevent the main rod 110 from moving away from the first pillar 122 in a first lateral direction or a second lateral direction perpendicular with respect to the first pillar 122 and parallel with respect to the first base 121. Also, the first connecting end 116 may protrude from the groove of the second end of the first pillar 122 to prevent the main rod 110 from falling off the first pillar 122.

Referring again to FIG. 1, the first supporting portion 123 may have a triangular shape. The first supporting portion 123 may be disposed on at least a portion of the first pillar 122. Moreover, the first supporting portion 123 may connect to the rack 11 and/or the other surface to support the first pillar 122.

The second elevating rack 130 may include a second base 131, a second pillar 132, and a second supporting portion 133, but is not limited thereto.

The second base 131 may be constructed as a planar surface. Moreover, the second base 131 may be disposed on at least a portion of the rack 11.

The second pillar 132 may be perpendicularly disposed at a first end away from the second base 131 with respect to a direction. Accordingly, the second pillar 132 may be perpendicularly disposed away from the rack 11 and/or any other surface under the second base 131 with respect to the direction while the second base 131 is disposed on the rack 11 and/or another surface. The second pillar 132 may receive and/or connect at a second end to the second end of the main rod 110 and/or the second connecting end 117. More specifically, the second end of the second pillar 132 may have a groove to receive the main rod 110 therein, such that the second end of the second pillar 132 may prevent the main rod 110 from moving away from the second pillar 132 in a first lateral direction or a second lateral direction perpendicular with respect to the second pillar 132 and parallel with respect to the second base 131. Also, the second connecting end 117 may protrude from the groove of the second end of the second pillar 132 to prevent the main rod 110 from falling off the second pillar 132.

Referring again to FIG. 1, the second supporting portion 133 may have a triangular shape. The second supporting portion 133 may be disposed on at least a portion of the second pillar 132. Moreover, the second supporting portion 133 may connect to the rack 11 and/or the other surface to support the second pillar 132.

The motor protection base 140 may be constructed of terrycloth, nitrile, ceramic, aluminum, fused silica, silicone, and/or any other heat resistant material, but is not limited thereto.

The motor protection base 140 may be removably connected to at least a portion of the motor 150 and/or the rack 11. The motor protection base 140 may insulate the motor 150 from an increase in a temperature level at a base thereof connected to the rack 11. In other words, the motor protection base 140 may prevent the motor 150 from the increase in the temperature level due to an increase in a temperature level of the rack 11.

The motor 150 may include a rod connector 151 and a cord connector 152, but is not limited thereto.

The motor 150 may be connected to at least a portion of the first pillar 122. The motor 150 may be configured to have a predetermined speed level corresponding to a speed level of a rotisserie rack. Specifically, the motor 150 may rotate at the predetermined speed level that is a conventional speed level for rotisserie style cooking. Alternatively, the motor 150 may be adjusted to have a speed level based on a preference of a user.

The rod connector 151 may include a rod disposed therein. The rod connector 151 may be disposed at a first end on at least a portion of the motor 150 and/or connected to the first supporting portion 123. Additionally, the cord connector 152 may be disposed on at least a portion of a second end of the rod connector 151 and/or connected to the first pillar 122. The rod connector 151 and/or the cord connector 152 may rotate in response to rotation of the motor 150.

The control unit 160 may include at least one button and a power source, but is not limited thereto.

The control unit 160 may be disposed on and/or within at least a portion of the motor 150. The at least one button of the control unit 160 may turn on and/or turn off the motor 150 in response to being depressed. Also, the at least one button of the control unit 160 may adjust the speed level of the motor 150 in response to depressing the at least one button for a predetermined period of time (e.g., five seconds, ten seconds, etc.).

The power source of the control unit 160 may include a battery, a sensor, and a thermoelectric generator, but is not limited thereto.

The power source of the control unit 160 may provide power to the motor 150. Additionally, the thermoelectric generator of the control unit 160 may provide power to the motor 150 in response to depressing the at least one button of the control unit 160 and/or in response to a temperature level of the oven 10 reaching a predetermined temperature level (e.g., three hundred degrees, three hundred fifty degrees, etc.) as detected by the sensor of the control unit 160. In other words, the thermoelectric generator of the control unit 160 may automatically provide power to the motor 150 after the temperature level of the oven 10 reaches the predetermined temperature level without use of the at least one button.

The cord 170 may include a chain, a rope, a wire, a string, and/or any combination thereof, but is not limited thereto.

The cord 170 may connect the first connecting end 116 to the cord connector 152. As such, the cord 170 and/or the main rod 110 may rotate in response to rotation of the motor 150 via the rod connector 151 and/or the cord connector 152.

The drain tray 180 may be disposed on at least a portion of the oven 10 below the main rod 110, such as another rack 11. As such, the drain tray 180 may collect at least one liquid dripping from food on the main rod 110.

Therefore, the rotisserie assembly 100 may provide rotisserie style cooking within the oven 10. Also, the rotisserie assembly 100 may be used in any conventional oven, which does not require the user to purchase a separate oven that can be expensive.

The present general inventive concept may include a rotisserie assembly 100 connected to at least a portion of a rack 11 of an oven 10, the rotisserie assembly 100 including a main rod 110 to receive food thereon, a first elevating rack 120 connected to a first end of the main rod 110 and disposed on the rack 11 to elevate the main rod 110 a distance away from the rack 11, a second elevating rack 130 connected to a second end of the main rod 110 and disposed on the rack 11 to elevate the main rod 110 the distance away from the rack 11, and a motor 150 connected to at least a portion of the first elevating rack 120 to rotate the main rod 110 in response to rotation of the motor 140.

The main rod 110 may include a center portion 111, a first fork fastener 112 connected to at least a portion of a first end of the center portion 111, a first fork 113 disposed on at least a portion of the first fork fastener 112 to puncture the food, a second fork fastener 114 connected to at least a portion of a second end of the center portion 111, and a second fork 115 disposed on at least a portion of the second fork fastener 114 to puncture the food.

The center portion 111 may be removable from the first fork fastener 112 and the second fork fastener 114.

The first fork 113 and the second fork 115 may be deformable.

The first elevating rack 120 may include a first base 121, and a first pillar 122 perpendicularly disposed at a first end away from the first base 121 with respect to a direction to connect at a second end to the first end of the main rod 110 and prevent the main rod 110 from moving away from the first pillar 122.

The second elevating rack 130 may include a second base 131, and a second pillar 132 perpendicularly disposed at a first end away from the second base 131 with respect to a direction to connect at a second end to the second end of the main rod 110 and prevent the main rod 110 from moving away from the second pillar 132.

The rotisserie assembly 100 may further include a motor protection base 140 removably connected to at least a portion of the motor 150 to insulate the motor 150 from an increase in a temperature level.

The rotisserie assembly 100 may further a cord 170 connected to the main rod 110 and the motor 150 to rotate the main rod 110 in response to rotation of the motor 150.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A rotisserie assembly connected to at least a portion of a rack of an oven, the rotisserie assembly comprising:
   a main rod to receive food thereon;
   a first elevating rack connected to a first end of the main rod and disposed on the rack of the oven to elevate the main rod a distance away from the rack of the oven, the first elevating rack comprising:
      a first base,
      a first pillar perpendicularly disposed at a first end away from the first base with respect to a direction to connect at a second end to the first end of the main rod and prevent the main rod from moving away from the first pillar, and
      a first support portion having a triangular shape and disposed on and extending laterally away from a bottom portion of the first pillar in a direction opposite from the first base;
   a second elevating rack connected to a second end of the main rod and disposed on the rack of the oven to elevate the main rod the distance away from the rack of the oven, the second elevating rack comprising:
      a second base,
      a second pillar perpendicularly disposed at a first end away from the second base with respect to a direction to connect at a second end to the second end of the main rod and prevent the main rod from moving away from the second pillar, and
      a second support portion having a triangular shape and disposed on and extending laterally away from a bottom portion of the second pillar in a direction opposite from the second base; and
   a motor connected to at least a portion of the first elevating rack to rotate the main rod in response to rotation of the motor.

2. The rotisserie assembly of claim 1, wherein the main rod comprises:
   a center portion;
   a first fork fastener connected to at least a portion of a first end of the center portion;
   a first fork disposed on at least a portion of the first fork fastener to puncture the food;
   a second fork fastener connected to at least a portion of a second end of the center portion; and
   a second fork disposed on at least a portion of the second fork fastener to puncture the food.

3. The rotisserie assembly of claim 2, wherein the center portion is removable from the first fork fastener and the second fork fastener.

4. The rotisserie assembly of claim 2, wherein the first fork and the second fork are deformable.

5. The rotisserie assembly of claim 1, further comprising:
   a motor protection base removably connected to at least a portion of the motor to insulate the motor from an increase in a temperature level.

6. The rotisserie assembly of claim 1, further comprising:
   a cord connected to the main rod and the motor to rotate the main rod in response to rotation of the motor.

* * * * *